UNITED STATES PATENT OFFICE 2,060,154

SUBSTITUTED AMIDES OF TERTIARY BUTYL ACETIC ACID

Frank C. Whitmore, State College, Pa., and August H. Homeyer, St. Louis, Mo., assignors to Mallinckrodt Chemical Works, St. Louis, Mo., a corporation of Missouri No Drawing. Application November 3, 1934, Serial No. 751,418

6 Claims. (Cl. 260—124)

This invention relates to derivatives of tertiary butyl acetic acid, and with regard to certain more specific features, to substituted amides of tertiary butyl acetic acid corresponding to the type formula:

$$(CH_3)_3C—CHX—CONR'R''$$

wherein X represents hydrogen or a halogen; R' represents hydrogen or a hydrocarbon radical; and R'' represents a hydrocarbon radical.

This application is in part a continuation of our application, Serial No. 666,512, filed April 17, 1933, and entitled "Acyl halides of tertiary butyl acetic acid", now Patent No. 2,034,850, dated March 24, 1936.

Among the several objects of the invention may be noted the provision of a series of substituted amides of tertiary butyl acetic acid corresponding to the above type formula which all embody the therapeutic effect of the presence of the quaternary carbon atom. Other objects will be in part obvious and in part pointed out hereinafter.

The invention accordingly comprises the elements and combinations of elements, and features of composition, which will be exemplified in the substances hereinafter described, and the scope of the application of which will be indicated in the following claims.

It has recently been determined that certain organic products including as a constituent thereof a quaternary carbon atom (that is, a carbon atom to which are directly linked four other carbon atoms) have valuable therapeutic properties, particularly in the field of hypnotics, sedatives, soporifics, analgesics, and bactericides and the like.

Among the products so constituted, the substituted amides of tertiary butyl acetic acid are a most valuable group. These amides have been determined to have valuable hypnotic or sedative or soporific effects when administered therapeutically, such effects being markedly improved over similar effects obtained from the analogous compounds (such as the substituted amides of secondary butyl acetic acid) not containing the quaternary carbon atom. The enhanced effect seems to be due to the fact that the quaternary carbon atom represents the maximum degree of carbon branching in the structure of the compound.

Likewise, the substituted amides falling within the type formula above seem to possess enhanced therapeutic effects over the unsubstituted amide of the same acid.

The substances set forth as examples hereinafter fall into two generic classes (referring to the type formula above), namely: substances wherein X in the type formula is a hydrogen, and substances wherein X is a halogen, specifically, bromine. The first class of substances are prepared by reacting the appropriate amine with tertiary butyl acetyl chloride, according to the type reaction:

$$(CH_3)_3C—CH_2—COCl + NHR'R'' \rightarrow$$
$$(CH_3)_3C—CH_2—CONR'R'' + HCl$$

The second class of substances are prepared by reacting the appropriate amine with alpha-bromo tertiary butyl acetyl chloride, according to the type reaction:

$$(CH_3)_3C—CHBr—COCl + NHR'R'' \rightarrow$$
$$(CH_3)_3C—CHBr—CONR'R'' + HCl$$

Both tertiary butyl acetyl chloride and alpha-bromo tertiary butyl acetyl chloride are obtained in pure form according to our said copending application, Serial No. 666,512.

*Example 1.—The monomethyl-amide of tertiary butyl acetic acid*

This substance, $(CH_3)_3C—CH_2—CONH—CH_3$, is prepared by reacting monomethyl amine, which is commercially obtainable, with tertiary butyl acetyl chloride. It is typical of substances corresponding to the type formula wherein X is hydrogen, R' is hydrogen, and R'' is an alkyl.

*Example 2.—The monoethyl-amide of the tertiary butyl acetic acid*

This substance, $$(CH_3)_3C—CH_2—CONH—CH_2CH_3,$$

is prepared by reacting monoethyl amine, which is commercially obtainable, with tertiary butyl acetyl chloride. Like Example 1, it is typical of substances corresponding to the type formula wherein X is hydrogen, R' is hydrogen, and R'' is an alkyl.

*Example 3.—The monoamyl-amide of tertiary butyl acetic acid*

This substance, $$(CH_3)_3C—CH_2—CONH—(CH_2)_4CH_3$$

is prepared by reacting monoamyl amine, which is commercially obtainable, with tertiary butyl acetyl chloride. Like Examples 1 and 2, it is typical of substances corresponding to the type

*Example 4.—The monoallyl-amide of tertiary butyl acetic acid*

This substance, (CH₃)₃C—CH₂—CONH—CH₂CH=CH₂, is prepared by reacting monoallyl amine, which is commercially obtainable, with tertiary butyl acetyl chloride. It is typical of substances within the type formula wherein X is hydrogen, R' is hydrogen, and R'' is an alkylene.

*Example 5.—The monocyclohexyl-amide of tertiary butyl acetic acid*

This substance, (CH₃)₃C—CH₂—CONH—C₆H₁₁, is prepared by reacting mono-cyclohexyl amine, which is commercially obtainable, with tertiary butyl acetyl chloride. It is typical of substances within the type formula wherein X is hydrogen, R' is hydrogen, and R'' is a cycloalkyl.

*Example 6.—The mono-2,2-dimethylpropyl-amide of tertiary butyl acetic acid*

This substance, (CH₃)₃C—CH₂—CONH—CH₂C(CH₃)₂CH₃, is prepared by reacting 2,2-dimethylpropyl amine, which may be prepared by methods set forth in the literature, with tertiary butyl acetyl chloride. It is typical, along with Examples 1, 2, and 3, of substances within the type formula wherein X is hydrogen, R' is hydrogen, and R'' is an alkyl, but is of particular interest since the substituent group as well as the acid radical contains a quaternary carbon atom.

*Example 7.—The anilide of tertiary butyl acetic acid*

This substance, (CH₃)₃C—CH₂—CONH—C₆H₅, is prepared by reacting aniline with tertiary butyl acetyl chloride. It is typical of substances within the type formula wherein X is hydrogen, R' is hydrogen, and R'' is an aryl.

The crude salt, which is in the form of yellow crystals, may be purified by boiling its alcoholic solution with bone char and crystallized on diluting with water.

*Example 8.—The dimethyl-amide of tertiary butyl acetic acid*

This substance, (CH₃)₃C—CH₂—CON—(CH₃)₂, is prepared by reacting dimethyl amine, commercially obtainable, with tertiary butyl acetyl chloride. It is typical of substances within the type formula wherein X is hydrogen, R' is an alkyl, and R'' is also an alkyl.

*Example 9.—The diethyl-amide of tertiary butyl acetic acid*

This substance, (CH₃)₃C—CH₂—CON—(CH₂CH₃)₂, is prepared by reacting diethyl amine with tertiary butyl acetyl chloride. It is typical, along with Example 8, of substances within the type formula wherein X is hydrogen, and R' and R'' are both alkyls.

As exemplary of this entire series of derivatives, specific instructions are here given for the preparation of this substance: 25 grams of diethyl amine are dissolved in 200 cc. of ethyl ether cooled in ice. 21 grams of tertiary butyl acetyl chloride are then added slowly from a separatory funnel, with shaking. A vigorous reaction occurs, with the evolution of heat and the precipitation of the diethyl amine hydrochloride. The solid is filtered off and extracted with ether to obtain the residue of the amide. The ether solutions are then combined and evaporated. The resulting oil is then fractionated, at 3 mm. pressure, to obtain the product.

*Example 10.—The methylphenyl-amide of tertiary butyl acetic acid*

This substance, (CH₃)₃C—CH₂—CON(CH₃)(C₆H₅), is prepared by reacting methylphenyl amine (monomethyl aniline), commercially obtainable, with tertiary butyl acetyl chloride. It is typical of substances within the type formula wherein X is hydrogen, R' is an alkyl, and R'' is an aryl.

If in all of the above ten examples, alpha-bromo tertiary butyl acetyl chloride is substituted for the tertiary butyl acetyl chloride, then a corresponding series of derivatives is obtained in which, referring to the type formula, X is bromine, while R' and R'' have in each case the same indication as in the respective examples. The following is a tabulation of such substances, the name and formula of each being given:

*Example 11.*—(From Example 1). The monomethyl-amide of alpha-bromo tertiary butyl acetic acid (CH₃)₃C—CHBr—CONHCH₃.

*Example 12.*—(From Example 2). The monoethyl-amide of alpha-bromo tertiary butyl acetic acid (CH₃)₃C—CHBr—CONH—CH₂CH₃.

*Example 13.*—(From Example 3). The monoamyl-amide of alpha-bromo tertiary butyl acetic acid (CH₃)₃C—CHBr—CONH—(CH₂)₄CH₃.

*Example 14.*—(From Example 4). The monoallyl-amide of alpha-bromo tertiary butyl acetic acid (CH₃)₃C—CHBr—CONH—CH₂CH=CH₂.

*Example 15.*—(From Example 5). The monocyclohexyl-amide of alpha-bromo tertiary butyl acetic acid (CH₃)₃C—CHBr—CONH—C₆H₁₁.

*Example 16.*—(From Example 6). The mono-2,2-dimethylpropyl-amide of alpha-bromo tertiary butyl acetic acid (CH₃)₃C—CHBr—CONH—CH₂C(CH₃)₂CH₃.

*Example 17.*—(From Example 7). The anilide of alpha-bromo tertiary butyl acetic acid (CH₃)₃C—CHBr—CONH—C₆H₅.

*Example 18.*—(From Example 8.) The dimethyl-amide of alpha-bromo tertiary butyl acetic acid (CH₃)₃C—CHBr—CON(CH₃)₂.

*Example 19.*—(From Example 9.) The diethyl-amide of alpha-bromo tertiary butyl acetic acid (CH₃)₃C—CHBr—CON(CH₂CH₃)₂.

*Example 20.*—(From Example 10.) The methylphenyl-amide of alpha-bromo tertiary butyl acetic acid $(CH_3)_3C-CHBr-CON(CH_3)(C_6H_5)$.

The following table gives some of the physical properties of the exemplary substances heretofore set forth:

| Example No. | Substituents in type formula $(CH_3)_3C-CHX-CONR'R''$ | | | M. P. | B. P. (mm.) | Form | $n_{20}^D$ |
|---|---|---|---|---|---|---|---|
| | X | R' | R'' | | | | |
| 1 | —H | —H | —CH₃ | | 93° (5 mm.) | Oil | |
| 2 | —H | —H | —CH₂—CH₃ | | 98° (6 mm.) | Oil | 1.4422 |
| 3 | —H | —H | —(CH₂)₄—CH₃ | | 130° (7 mm.) | Oil | 1.4481 |
| 4 | —H | —H | —CH₂—CH=CH₂ | | 105° (7 mm.) | Oil | 1.4575 |
| 5 | —H | —H | —C₆H₁₁ | 146-7° | | Cryst. | |
| 6 | —H | —H | —CH₂—C(CH₃)₂—CH₃ | 147-8° | | Cryst. | |
| 7 | —H | —H | —C₆H₅ | 131° | | Cryst. | |
| 8 | —H | —CH₃ | —CH₃ | | 63-5° (6 mm.) | Oil | 1.4450 |
| 9 | —H | —CH₂—CH₃ | —CH₂—CH₃ | | 69° (3 mm.) | Oil | 1.4440 |
| 10 | —H | —CH₃ | —C₆H₅ | | 110° (5 mm.) | Oil | 1.4980 |
| 11 | —Br | —H | —CH₃ | 113-4° | | Cryst. | |
| 12 | —Br | —H | —CH₂—CH₃ | 110-1° | | Cryst. | |
| 13 | —Br | —H | —(CH₂)₄—CH₃ | | 143° (6 mm.) | Oil | 1.4830 |
| 14 | —Br | —H | —CH₂—CH=CH₂ | | 126° (6 mm.) | Oil | 1.4989 |
| 15 | —Br | —H | —C₆H₁₁ | 183-4° | | Cryst. | |
| 16 | —Br | —H | —CH₂—C(CH₃)₂—CH₃ | 166-7° | | Cryst. | |
| 17 | —Br | —H | —C₆H₅ | 151½-2½° | | Cryst. | |
| 18 | —Br | —CH₃ | —CH₃ | | 95° (5 mm.) | Oil | 1.4930 |
| 19 | —Br | —CH₂—CH₃ | —CH₂—CH₃ | 35-6° | 106-9° (5 mm.) | Cryst. | |
| 20 | —Br | —CH₃ | —C₆H₅ | | 140° (6 mm.) | Oil | 1.4990 |

In the above table, "M. P." indicates melting point; "B. P. (mm.)" indicates boiling point under so many millimeters of mercury pressure; and $$n\frac{D}{20}$$

indicates the index of refraction, at 20°, with respect to the sodium-D line. Degrees temperature are given to the centigrade scale throughout this application.

Numerous other substituted amides falling within the type formula can be made by analogous methods.

Other methods of preparation may likewise be used for obtaining the substances hereinbefore mentioned. For example, the acid chlorides used throughout may be replaced by acid bromides.

In view of the above, it will be seen that the several objects of the invention have been achieved and other advantageous results attained.

As many changes could be made in carrying out the above syntheses and in effecting the above compositions without departing from the scope of the invention, it is intended that all matter contained in the above description shall be interpreted as illustrative and not in a limiting sense.

We claim:

1. A substituted amide of tertiary butyl acetic acid corresponding to the type formula:

$$(CH_3)_3C-CHX-CONR'R''$$

where X represents hydrogen or a halogen, R' represents hydrogen or a hydrocarbon radical, and R'' represents a hydrocarbon radical.

2. A substituted amide of tertiary butyl acetic acid corresponding to the type formula:

$$(CH_3)_3C-CH_2-CONR'R''$$

where R' represents hydrogen or a hydrocarbon radical, and R'' represents an alkyl, alkylene, cycloalkyl, or aryl.

3. A substituted amide of alpha-bromo tertiary butyl acetic acid corresponding to the type formula:

$$(CH_3)_3C-CHBr-CONR'R''$$

where R' represents hydrogen or a hydrocarbon radical, and R'' represents an alkyl, alkylene, cycloalkyl, or aryl.

4. The anilide of tertiary butyl acetic acid.

5. The diethyl-amide of tertiary butyl acetic acid.

6. The diethyl-amide of alpha-bromo tertiary butyl acetic acid.

FRANK C. WHITMORE.
AUGUST H. HOMEYER.